United States Patent
Hajnoczi et al.

(10) Patent No.: US 12,346,467 B2
(45) Date of Patent: Jul. 1, 2025

(54) SECURE AND EFFICIENT ACCESS TO HOST MEMORY FOR GUESTS

(71) Applicant: Red Hat, Inc., Raleigh, NC (US)

(72) Inventors: Stefan Hajnoczi, St. Neots (GB);
Vivek Goyal, Westford, MA (US);
David Alan Gilbert, Manchester (GB);
Steven John Whitehouse, Swansea (GB); Miklos Szeredi, Piliscsaba (HU)

(73) Assignee: Red Hat, Inc., Raleigh, NC (US)

( * ) Notice: Subject to any disclaimer, the term of this patent is extended or adjusted under 35 U.S.C. 154(b) by 612 days.

(21) Appl. No.: 16/259,590

(22) Filed: Jan. 28, 2019

(65) Prior Publication Data

US 2020/0242263 A1 Jul. 30, 2020

(51) Int. Cl.
| | |
|---|---|
| G06F 21/62 | (2013.01) |
| G06F 9/455 | (2018.01) |
| G06F 9/50 | (2006.01) |
| G06F 9/54 | (2006.01) |
| G06F 12/1009 | (2016.01) |
| G06F 21/53 | (2013.01) |
| G06F 21/60 | (2013.01) |

(52) U.S. Cl.
CPC ...... *G06F 21/6218* (2013.01); *G06F 9/45558* (2013.01); *G06F 9/5016* (2013.01); *G06F 9/546* (2013.01); *G06F 12/1009* (2013.01); *G06F 21/53* (2013.01); *G06F 21/604* (2013.01); *G06F 2009/45579* (2013.01); *G06F 2209/548* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 8,677,449 B1 | 3/2014 | Beda, III | |
| 9,128,877 B1 * | 9/2015 | Cousins | ............ H03M 13/1515 |
| 9,455,914 B2 | 9/2016 | Singh et al. | |
| 10,095,707 B1 | 10/2018 | Whitmer et al. | |
| 2006/0294049 A1 * | 12/2006 | Sechrest | ................. G06F 16/11 |

(Continued)

OTHER PUBLICATIONS

Pan, et al., "Integrating High Performance File Systems in a Cloud Environment," 2012, IEEE Computer Society, 2012 SC Companion: High Performance Computing, Networking Storage and Analysis, pp. 753-759, terieved from https://ieeexplore.ieee.org/stamp/stamp.jsp?tp=&arnumber=6495885 on Sep. 27, 2024. (Year: 2012).*

(Continued)

*Primary Examiner* — Chat C Do
*Assistant Examiner* — William C Wood
(74) *Attorney, Agent, or Firm* — Kilpatrick Townsend & Stockton LLP

(57) ABSTRACT

Secure and efficient access to host memory for guests is disclosed. For example, a system includes (i) a processor, (ii) a host memory, (iii) a hypervisor including a filesystem daemon, (iv) a guest including a storage controller, and (v) a first filesystem queue. The storage controller is configured to receive a file request, translate the file request, and add the translated file request to a filesystem queue. The filesystem daemon is configured to retrieve the translated file request from the filesystem queue and provide access to a file in the host memory identified in the file request to the guest.

19 Claims, 8 Drawing Sheets

(56) References Cited

U.S. PATENT DOCUMENTS

| | | | |
|---|---|---|---|
| 2008/0010284 A1* | 1/2008 | Beck | G06F 16/128 |
| 2010/0023565 A1* | 1/2010 | Colbert | G06F 9/45558 |
| | | | 718/1 |
| 2011/0119669 A1* | 5/2011 | McRae | G06F 9/45558 |
| | | | 718/1 |
| 2012/0254248 A1* | 10/2012 | Xu | G06F 16/2246 |
| | | | 707/791 |
| 2012/0284712 A1* | 11/2012 | Nimmagadda | G06F 9/5077 |
| | | | 718/1 |
| 2013/0282776 A1* | 10/2013 | Durrant | G06F 21/6218 |
| | | | 707/827 |
| 2015/0160963 A1* | 6/2015 | Borntraeger | G06F 12/1009 |
| | | | 718/1 |
| 2016/0253193 A1* | 9/2016 | Tsirkin | G06F 9/45558 |
| | | | 718/1 |
| 2018/0131583 A1* | 5/2018 | Barrows | H04L 67/306 |
| 2019/0370050 A1* | 12/2019 | Kumar | G06F 12/1063 |
| 2021/0072927 A1* | 3/2021 | Yang | G06F 3/0659 |

OTHER PUBLICATIONS

To Fuse or Not to Fuse: Performance of User-Space File Systems by Bharath Vangoor, et al.; 15 USENIX Conference on File and Storage Technologies; Feb. 27, 2017; pp. 59-72.

* cited by examiner

US 12,346,467 B2

SECURE AND EFFICIENT ACCESS TO HOST MEMORY FOR GUESTS

BACKGROUND

The present disclosure generally relates to virtualized computer systems. For scalability and efficiency reasons, many computer systems employ virtualized guests such as virtual machines and containers to execute computing tasks performed by the computing systems, such as for hosting application programs. Typically, guests such as containers and virtual machines may be launched to provide extra compute capacity, while isolating compute resources used by different users and tenants away from those of other users. Guests enable rapid scaling of application deployments to the volume of traffic requesting the applications, and allow applications to be deployed in a variety of hardware hosting environments. Multiple guests may also be clustered together to perform more complex functions than the respective guests are capable of performing individually. To interact with a broader set of users and a broader computing ecosystem, guests typically employ virtualized devices such as virtualized memory devices and virtualized input/output ("I/O") devices controlled by drivers.

SUMMARY

The present disclosure provides a new and innovative system, methods and apparatus for secure and efficient access to host memory for guests. In an example, a system includes (i) a processor, (ii) a host memory, (iii) a hypervisor including a filesystem daemon, (iv) a guest including a storage controller, and (v) a first filesystem queue. The storage controller is configured to receive a file request, translate the file request, and add the translated file request to a filesystem queue. The filesystem daemon is configured to retrieve the translated file request from the filesystem queue and provide access to a file in the host memory identified in the file request to the guest.

Additional features and advantages of the disclosed method and apparatus are described in, and will be apparent from, the following Detailed Description and the Figures.

DETAILED DESCRIPTION OF EXAMPLE EMBODIMENTS

Figure 1:
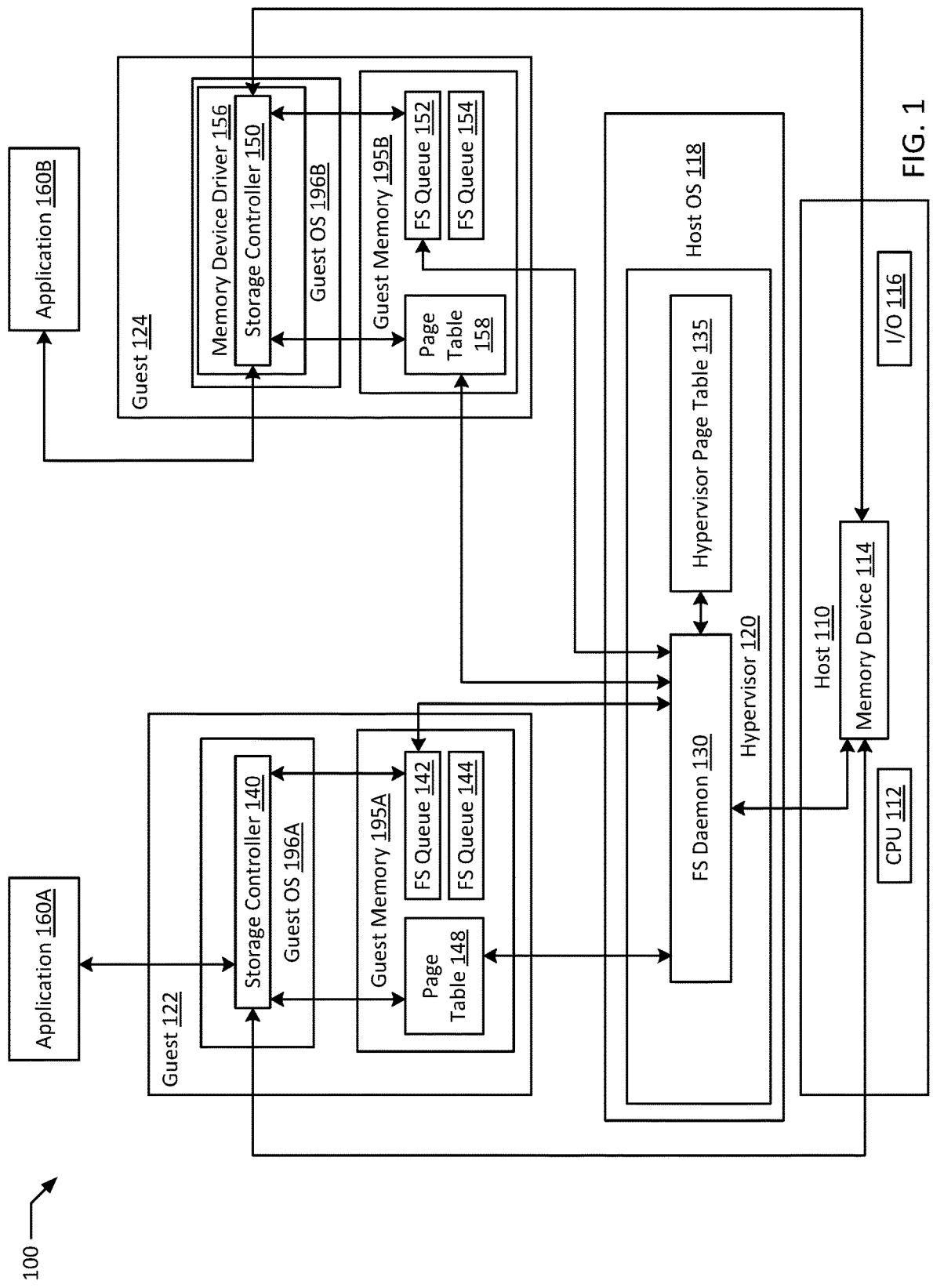
FIG. 1 is a block diagram of a system implementing secure and efficient access to host memory for guests according to an example of the present disclosure.

In many computer systems, physical hardware may host guests such as virtual machines and/or containers. In an example, a virtual machine ("VM") may be a robust simulation of an actual physical computer system utilizing a hypervisor to allocate physical resources to the virtual machine. In sharing physical computing resources, guests and/or a hypervisor controlling them, may also have access to shared components of the underlying host, for example, I/O devices (e.g., network interface cards ("NICs"), storage controllers, USB controllers, PS2 interfaces, etc.) and memory devices (e.g., transient memory (e.g., DRAM), hard drive disks ("HDD"), solid state drives ("SSD"), persistent memory (e.g., Non-Volatile Dual In-line Memory Module ("NVDIMM")), etc.). However, such access is typically restricted through a virtualization manager such as a hypervisor to ensure that virtual environments remain segregated and to prevent unauthorized access to the resources of other virtual environments on the same host, and/or unauthorized access to the host itself. In many cases, direct access to physical hardware, including physical I/O devices and memory, may be configured to require elevated access to prevent security risks from giving guest userspace components (e.g., applications executing without elevated rights) access to these physical components. For example, with rights to directly manipulate memory, a malicious user with limited user access to a system may be able to read the data of other accounts and/or execute destructive or other malicious code.

Guests deployed on the same host, whether physical or virtual, may often share certain characteristics. For example, these guests may share host specific configurations. These guests may also share processing tasks, for example, a first guest on the host may pass its results to a second guest for further processing. Therefore, it is often advantageous from a latency perspective to allow different guests on the same host system to share data through sharing memory access between the guests and also their host. For example, a host memory address may be mapped to two separate guests allowing both guests access to the data stored in the host memory address location. However, such access may present potential security risks, as isolating guests' memory access is often a key feature of allowing virtualized guests to operate as independent computing systems on the same hardware node. Therefore, even though memory sharing may be advantageous from a processing latency perspective, memory sharing implementations are typically less secure than communication via a networking protocol. For example, two systems that share access to the same memory will naturally also have a degree of control over each other's memory space (e.g., the shared memory addresses), which presents a possible vector for gaining unauthorized access to each other's memory contents. In a typical memory sharing implementation, a supervisor (e.g., kernel) of a source guest may typically require a degree of control over guest physical addresses (GPAs) of a destination guest in order to manage memory access to the memory addresses where the source guest has stored data. A supervisor of the destination guest may then map these GPAs to guest virtual addresses (GVAs) in the destination guest to allow programs in the destination guest to access this data. Shared memory access by guests hosted on the same system is typically provided by a hypervisor managing memory access for both the source and destination guests. However, in such an implementation, the source guest's kernel has elevated access to the destination guest's memory mappings creating a potential security risk. For example, having control over a destination guest's memory mappings typically requires that the source guest's kernel is able to instruct the hypervisor to perform memory operations outside of the source guest's memory space (e.g., in the destination guest's memory space), potentially including granting the source guest control over certain hypervisor page table entries. The potential security risks associated with sharing memory with other guests would be further elevated in scenarios where access is granted to host memory and not just memory of other guests. For example, a malicious actor who gains access to a guest with access to host memory may be able to read data stored by the host as well as other guests on the same physical system.

Virtualized guests may typically be implemented in several different ways (e.g., full virtualization, paravirtualization/hybrid virtualization, OS level virtualization). In fully virtualized systems, guests are unaware that they have been virtualized at all, and their guest operating systems issue hardware commands that are received by emulated hardware devices in the hypervisor. Fully virtualized systems allow for the greatest flexibility for running code in a guest that is incompatible with the host's operating system. In paravirtualization or hybrid virtualization models, at least some components in the guest know that the guest is virtualized, and rather than submitting hardware commands to a hypervisor, such guests are typically configured with drivers that pass software requests on to the hypervisor, allowing the hypervisor to interface with the hardware. Paravirtualized guests may be configured with virtual I/O devices (e.g., network devices, storage devices) that appear to applications executing on the guest as actual physical I/O devices, when, in actuality, these virtual devices are actually configured to forward I/O commands and messages to corresponding devices on the guest's host that actually interact with physical networking or storage devices. In these paravirtualized implementations, the guest operating system, or at least virtual devices and/or virtual device drivers, would typically be aware that the virtual devices are virtualized. The virtual devices would work in conjunction with their host's hypervisor to deliver enhanced performance in a paravirtualization model as compared to having the hypervisor fully emulate a device for the guest to use. Paravirtualization implementations include standards such as Virtio, Xen®, and VMWare Guest Tools®. OS level virtualization is most commonly implemented in the form of containers (e.g., Docker) where the guest is not configured to execute a full operating system, instead directly interfaces with its host's OS (e.g., for I/O operations). OS level virtualization incurs the least overhead, however, OS level virtualization requires that guests execute code that is compatible with their host's OS.

Programs, whether executing on a physical host or in a virtualized guest, may typically require some form of persistent storage (e.g., storage where data persists after a loss of power) to store current execution states of the programs. Persistent storage devices (e.g., HDDs, SSDs, persistent memory, etc.) may typically be configured with a filesystem that provides a structure for accessing and retrieving the data stored in the storage device. Operating systems, whether on a host or a guest, may additionally be configured with virtual filesystems, which provide an abstraction layer on top of hardware filesystems. Virtual filesystems may be implemented to provide a uniform interface for interacting with different hardware filesystems that may be implemented with incompatible interfaces.

The present disclosure provides for access to host memory for guests while limiting security risks by providing the host memory access through an indirect channel implemented by combining virtualized networking protocols with a virtualized filesystem. In an example, guests may be configured to access persistent storage devices by mounting a filesystem associated with a storage volume on the storage device. In the example, a paravirtualized storage device may be implemented in a guest, where the paravirtualized device (or its driver) is aware that it is a virtual device. In the example, communications between the paravirtualized virtual device and a hypervisor may be established via queues implemented in device memory allocated to the virtual device, where the queues are accessible to both the guest (e.g., via the virtual device's driver) and also to the hypervisor. These queues may be configured to pass software commands and data rather than hardware commands, since both the paravirtualized virtual device and the hypervisor are aware that the virtual device is virtualized.

A virtual filesystem implementation may be combined with a paravirtualized virtual storage device to effectively and securely provide access to files stored on another system (e.g., a separate guest, a host of a guest). For example, Filesystem in Userspace ("FUSE") is a filesystem virtualization implementation that allows non-privileged users to create and mount virtual filesystems. FUSE is designed to provide less privileged accounts (e.g., non-privileged users) an interface to define file access rights without modifying privilege restricted code of supervisors (e.g., kernel code). In a typical FUSE implementation, a user file request is sent by a storage controller in the kernel back to a filesystem daemon executing in userspace to be processed. This allows a virtual filesystem defined in userspace to behave as if it is a filesystem directly controlling access to a storage device mounted to the kernel when a userspace application interacts with the virtual filesystem. By moving the filesystem daemon in such an implementation to the hypervisor controlling memory access for a guest, the filesystem daemon, instead of being restricted to accessing storage devices available to the guest, is instead granted access to any storage device, whether virtual or physical, available to the hypervisor.

In an example, a virtual storage device on a guest includes a storage controller (e.g., FUSE client/driver) that reinterprets file requests made by a guest user to the guest kernel into a virtual filesystem request ("VFS request") (e.g., FUSE request). This VFS request is sent to a filesystem daemon ("FS daemon") on the host of the guest (e.g., in the hypervisor) via a virtual I/O protocol (e.g., Virtio). For example, FUSE requests may be packaged into Virtio messages placed in Virtio queues shared by the storage controller and FS daemon. The FS daemon may then be configured to interact with the host kernel, which performs memory address translation to locate and retrieve the data sought via the file request made by the guest user. The hypervisor (in conjunction with the guest kernel) provides security controls via access permissions to the requested data. Upon the host kernel locating the data and the hypervisor validating access rights, the data may be repackaged by the FS daemon into a message for the virtual I/O protocol (e.g., a Virtio message in a Virtio queue) returning the data to the virtual storage device and the guest kernel, which may then provide access to the retrieved copy of the data to the guest user requesting the data. Access may be similarly requested for data belonging to other guests, since the FS daemon would have access to the data of each guest executing on the host. Efficiency is achieved because paravirtualization protocols such as Virtio are well optimized for guest to host communications, while data security against malicious intrusion is maintained so long as the hypervisor or host kernel hosting the FS daemon can be trusted. Therefore, the presently disclosed secure and efficient access to host memory for guests allows for sharing data between a guest, its host, and other guests on the host, that is faster and more efficient while being at least similarly secure as compared with other data sharing techniques.

Other existing shared filesystem protocols such as NFS and 9PFS may also be extended to provide similar inter-system memory access to the proposed combination of extensions to Virtio and Fuse. Some of these implementations (e.g., NFS, 9PFS) may lack full POSIX compatibility, and therefore require applications to be developed with these protocols in mind, which significantly restricts backwards compatibility and inter-platform compatibility. Some of the flexibility in scalability offered by virtualization would therefore be limited. However, the example protocols (e.g., Virtio and Fuse), which are provided as illustrative examples only, allow for fairly straight forward implementations of the present disclosure as they are not full network filesystems and therefore do not have to fully support file operations across a network. Any suitable paravirtualization protocol may be combined with any suitable virtual filesystem protocol to implement the methods disclosed herein and systems configured to execute such methods.

FIG. 1 is a block diagram of a system implementing secure and efficient access to host memory for guests according to an example of the present disclosure. The system 100 may include one or more host(s) 110. In an example, host 110 is a physical host, with physical processors (e.g., CPU 112), physical memory device(s) (e.g., memory device 114), and physical I/O devices (e.g., I/O 116). Host 110 may also be a virtual machine with corresponding virtualized components. In either example, host 110 would appear to guests executing on host 110 (e.g., guests 122 and 124) as a physical host. As used herein, processor or processors 112 refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory device 114 refers to volatile or non-volatile memory devices, such as RAM, ROM, EEPROM, or any other device capable of storing data. As discussed herein, I/O device(s) 116 refer to devices capable of providing an interface between one or more processor pins and an external device, the operation of which is based on the processor inputting and/or outputting binary data. For example, a network interface card may be an example of an I/O device through which host 110 and guests 122 and/or 124 hosted on host 110 communicates with external systems over a network. CPU(s) 112 may be interconnected using a variety of techniques, ranging from a point-to-point processor interconnect, to a system area network, such as an Ethernet-based network. Local connections within host 110, including the connections between processor 112 and a memory device 114 and between processor 112 and I/O device 116 may be provided by one or more local buses of suitable architecture, for example, peripheral component interconnect ("PCI").

In an example, host 110 may host one or more guests, for example, guest 122 and 124. In an example guests may be VMs and/or containers, which may host additional nested layers of guests. For example applications 160A or B may be another virtual guest nested inside of guest 122 or 124. In an example, a container as referred to herein may be implemented with any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, guest 122 may be a VM executing on host 110. In an example, guest 122 may be a container executing on a physical or virtual host (e.g., host 110). In addition, containers and/or VMs may further host other guests necessary to execute their configured roles (e.g., a nested hypervisor or nested containers). For example, a VM (e.g., guest 122) and/or a container may further host a Java® Virtual Machine ("JVM") if execution of Java® code is necessary.

System 100 may run one or more VMs (e.g., guest 122), by executing a software layer (e.g., hypervisor 120) above the hardware and below the guest 122, as schematically shown in FIG. 1. In an example, the hypervisor 120 may be a component of respective host operating system 118 executed on host 110. In another example, the hypervisor 120 may be provided by an application running on host operating system 118. In an example, hypervisor 120 may run directly on host 110 without an operating system beneath hypervisor 120. Hypervisor 120 may virtualize the physical layer, including processors, memory, and I/O devices, and present this virtualization to guest 122 as devices, including virtual central processing units, virtual memory devices, virtual input/output devices, and/or guest memory 195A. In an example, guest 124 may be a similar guest to guest 122, hosting a second copy of application 160A (e.g., application 160B).

Guests 122 and 124 may run on any type of dependent, independent, compatible, and/or incompatible applications on the underlying hardware and host operating system 118. In an example, a container or application (e.g., applications 160A-B) running on guests 122 and 124 may be dependent on the underlying hardware and/or host operating system 118. In another example, a container or application (e.g., applications 160A-B) running on guests 122 and 124 may be independent of the underlying hardware and/or host operating system 118. In an example, a container or application (e.g., applications 160A-B) running on guests 122 and 124 may be compatible with the underlying hardware and/or host operating system 118. Additionally, a container or application (e.g., applications 160A-B) running on guests 122 and 124 may be incompatible with the underlying hardware and/or OS. The hypervisor 120 may manage memory for the host operating system 118 as well as memory allocated to the guests 122 and 124 and guest operating system 196A-B such as guest memory 195A-B provided to guest OSes 196A-B.

In an example, any form of suitable network for enabling communications between computing devices, for example, a public network (e.g., the Internet), a private network (e.g., a local area network (LAN) or wide area network (WAN)), or a combination thereof may be employed to connect host 110, guests 122 and 124, and/or to other computer systems.

In an example, hypervisor 120 allocates respective sections of host memory in memory device 114 as dedicated device memory for guest memory devices (e.g., guest memories 195A and 195B). In an example, guest OS 196A and applications executing on guest 122 (e.g., application 160A) access guest memory 195A via storage controller 140. In an example, guest OS 196B and applications executing on guest 124 (e.g., application 160B) access guest memory 195B via storage controller 150, which is a component part of memory device driver 156 associated with guest memory 195B. In an example, guest memories 195A-B are virtual memory devices implemented on guests 122 and 124 respectively. In the example, these virtual memory devices are configured to provide access for guests 122 and 124 to data in memory device 114 of host 110 and/or to each other's memory spaces. In an example, the device memory allocated to guest memories 195A by hypervisor 120 is also virtualized to allow guest 122 to access those memory addresses. In an example, filesystem queues (e.g., FS queues 142, 144 and FS queues 152, 154) are added to the device memory. In an example, FS queues 142 and 144, being stored in device memory for the guest memory device of guest memory 195A, are accessible to both the guest 122 as well as hypervisor 120, including by FS daemon 130. Therefore FS queues 142 and 144 provide a communication channel between guest 122 and FS daemon 130. FS queues 152 and 154 similarly provide a communication channel between guest 124 and FS daemon 130.

In typical computer systems, there may be more data referenced by executing applications (both applications executing on physical hardware and those in virtualized guests on the physical hardware) than the amount of random access memory available on the system. Typically, memory virtualization is implemented to allow memory to be shared among these various processes. For example, data may be loaded to memory when it is needed for a program to execute, and then moved to slower storage such as hard disk when the data is not being accessed. In an example, memory paging is implemented to track the virtual addresses of the data of executing applications. A given memory address may be referenced by any number of virtual addresses. Page tables that perform lookups to translate between virtual and physical memory addresses may be implemented with granular access controls, such that a given execution context (e.g., guest user, guest kernel, host user, host kernel) may access only those memory locations that it has permission to access. In an example, page tables 148 and 158 provide translation of virtualized guest memory addresses (e.g., between guest virtual addresses ("GVA") and guest physical addresses ("GPA")), while hypervisor page table 135 provides translation between GPAs or host virtual addresses ("HVA") and host physical addresses ("HPA"). In some systems an extra layer of translation may be implemented between GPAs and HVAs.

Figure 2A:
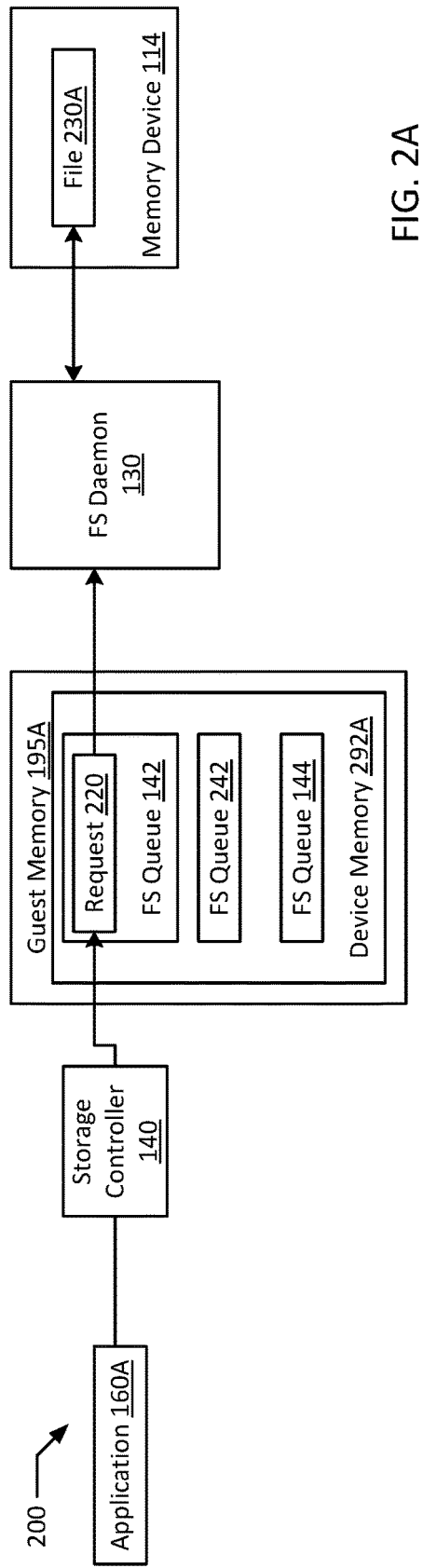
FIGS. 2A-B are block diagrams illustrating an application in a guest accessing a file in a host memory device according to an example of the present disclosure.
Figure 2B:
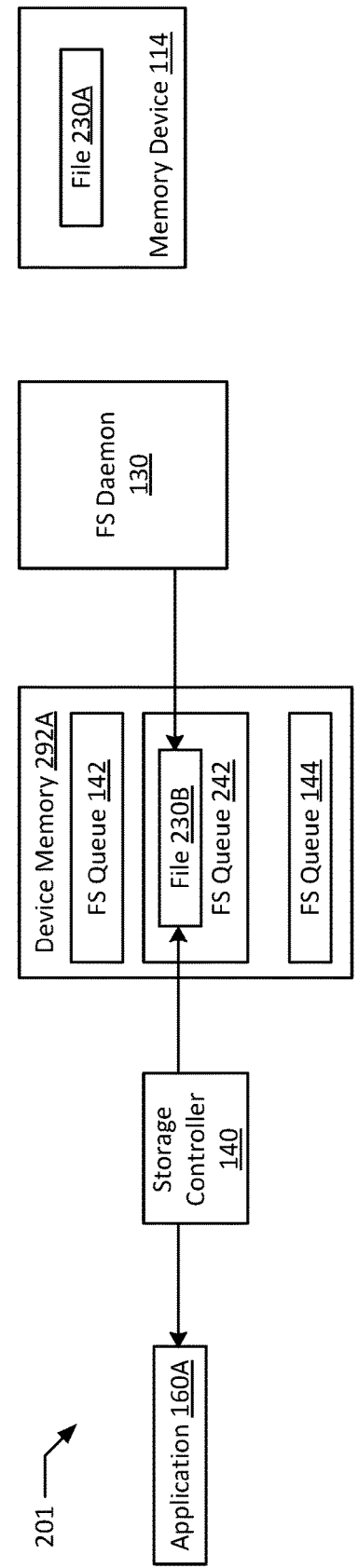

FIGS. 2A-B are block diagrams illustrating an application in a guest accessing a file in a host memory device according to an example of the present disclosure. In system 200 depicted in FIG. 2A, application 160A requests access to file 230A in memory device 114, and storage controller 140 executes in conjunction with FS daemon 130 to locate file 230A for retrieval. In an example, application 160A first sends a file request to storage controller 140 (e.g., open file/bin/ls). Guest OS 196A determines that the/bin directory is located in a filesystem mounted as guest memory 195A, and that access to guest memory 195A is provided via storage controller 140. In an example, storage controller 140 is a component of a virtual storage device providing a storage volume accessible to guest 122 (e.g., guest memory 195A). In another example, storage controller 140 is a component of a driver for the virtual storage device executing in guest OS 196A. Guest memory 195A may be implemented with a reserved device memory 292A in which a plurality of filesystem queues (e.g., FS queues 142, 144, and 242) are stored. In an example, storage controller 140 takes the file request sent from application 160A to guest OS 196A, and translates the request. For example, translation may include packing the request into a message envelope compatible with FS queue 142 (e.g., a Virtio message). In addition, translation may include converting the file request received by guest OS 196A into a filesystem request format accepted by FS daemon 130 (e.g., a FUSE_OPEN or FUSE_OPENDIR request). In an example, storage controller 140 may be configured to perform translation similarly to a typical FUSE implementation where the FUSE daemon would be located in the userspace of guest 122, but the translation output may be redirected to FS daemon 130 in hypervisor via FS queue 142 in the form of request 220. In an example, request 220 includes several parameters related to file 230A. For example, request 220 may include a file handle to identify file 230A and an offset within file 230A locating the portion of file 230A guest 122 intends to retrieve. In an example, request 220 includes an identifier for a range of available guest virtual memory addresses of guest 122 that are available to be associated with file 230A for when request 220 is granted (e.g., addresses assignable to file 230B). In an example, FS daemon 130 is configured to retrieve messages from FS queues 142 and 144. For example, FS daemon 130 may subscribe to alerts of memory modifications in the memory addresses associated with FS queues 142 and 144 generated by hypervisor 120 and/or host OS 118. In an example, upon receiving request 220, FS daemon 130 removes any transmission protocol related wrapper (e.g., Virtio wrapper) on the filesystem request to receive the filesystem request. FS daemon 130 then converts the request into a memory access request to hypervisor 120. For example, hypervisor 120 may be a virtual machine monitor (e.g., Quick Emulator ("QEMU")) that performs memory lookup, address translation, and address mapping to provide access to files in host memory. In the example, FS daemon 130 requests the file requested by application 160A (e.g., the ls command) from hypervisor 120. In the example, hypervisor 120 locates file 230A in memory device 114, validates access permissions to the file, and maps the memory address of file 230A (e.g., via mmap) to an address accessible to FS daemon 130.

In various examples, multiple layers of file access control may be implemented. For example, guest OS 196A may first validate that application 160A has access to the requested file (e.g., the/bin/ls executable). In an example, after such validation, storage controller 140 may send a filesystem request to FS daemon 130 with the credentials of guest OS 196A (e.g., the guest kernel). FS daemon 130 may then validate that guest OS 196A has access to the files represented in the filesystem of guest memory 195A, including the/bin/ls executable. Hypervisor 120 may then validate that FS daemon 130, and/or guest OS 196A has access to the host memory addresses of the file in memory device 114.

Figure 3:
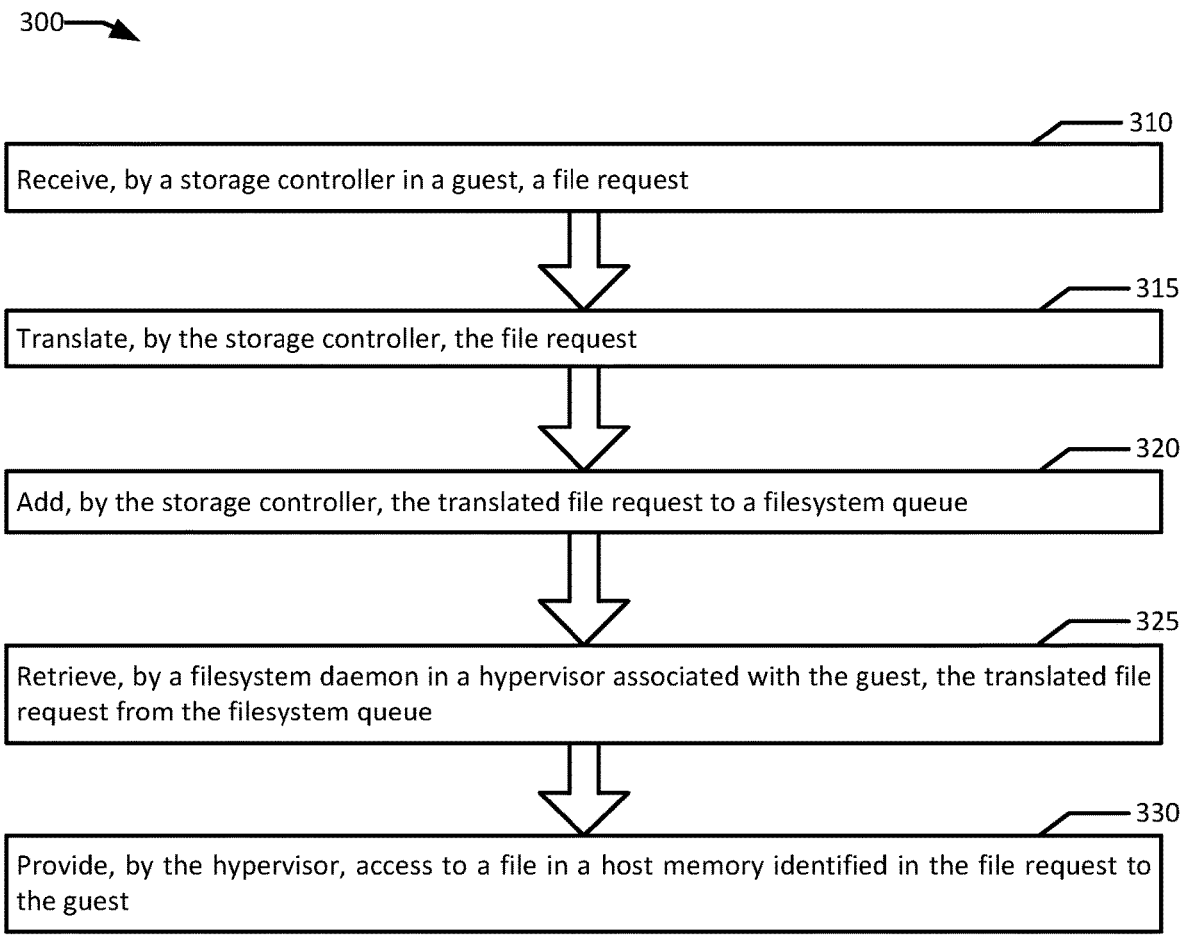
FIG. 3 is a flowchart illustrating an example of retrieving a file in host memory by a guest according to an example of the present disclosure.

System 201 illustrated in FIG. 2B is a later state of system 200 after FS daemon 130 is provided access to file 230A by hypervisor 120. In an example, hypervisor 120 provides access to file 230A to FS daemon 130 by mapping file 230A to a memory address accessible to FS daemon 130. In an example, the memory address of file 230A is also mapped to device memory 292A (e.g., in FS queue 242), providing access to the file to storage controller 140. In an example, prior to being placed in a filesystem queue, file 230A may require translation by FS daemon 130 (e.g., into a format compatible with the transport layer). For example, FS daemon 130 may retrieve a copy of file 230A, wrap it in a Virtio message envelope, and then load the converted message into FS queue 242 as file 230B. In an example, storage controller 140 provides access to file 230B to application 160A after the entire message envelope containing file 230B is loaded into FS queue 242. In an example, file 230B may be copied into guest 122's memory space to clear up capacity in FS queue 242 for additional messages (e.g., files, file requests, filesystem operations requests, metadata requests, etc.). For example, memory addresses of guest memory 195A not reserved for device memory 292A may be used to store a copy of file 230B for application 160A to access as a cached, local working copy of file 230A. In an example, FS daemon 130 determines a file requested by a guest (e.g., file 230A) based on request 220. In the example, FS daemon 130 opens a file identifier (e.g., a file descriptor and/or inode associated with host OS 118) for file 230A, and passes the file identifier to hypervisor 120 for hypervisor 120 to perform memory mapping in hypervisor page table 135 and/or guest page table 148. In an example, hypervisor 120 may execute a mmap( ) call to map all or part of file 230A to FS daemon 130's memory space (e.g., a host virtual address accessible to FS daemon 130). In an example, when hypervisor 120 maps file 230A to FS daemon 130's memory space file 230A may not yet be loaded to random access memory (e.g., memory device 114) on host 110. Instead, file 230A may be stored in a persistent storage device (e.g., HDD, SSD). In the example, when FS daemon 130 requests file 230A via the mapped memory address a page fault occurs, and upon the page fault being resolved, file 230A is loaded into memory device 114 so that FS daemon 130 can load file 230B into FS queue 242. FIG. 3 is a flowchart illustrating an example of retrieving a file in host memory by a guest according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by a storage controller 140 and a FS daemon 130.

Example method 300 may begin with receiving, by a storage controller in a guest, a file request (block 310). For example, storage controller 140 in guest 122 receives a file request from application 160A. In an example, the file request may include any valid file operation recognized by guest OS 196A (e.g., OPEN, READ, DELETE, CLOSE, RELEASE, WRITE, COMMIT, UPDATE, etc.). In an example, guest OS 196A recognizes that application 160A requested a file operation on a file 230A in a virtual filesystem associated with a storage volume mounted as guest memory 195A, access to which is controlled by storage controller 140. In an example, storage controller 140 is a component of a guest memory device associated with guest memory 195A. In another example, storage controller 140 is a component of a driver for a guest memory device executing on guest OS 196A. In an example, guest memory 195A is configured to provide access to files (e.g., file 230A) stored in host memory (e.g., memory device 114). In an example, the mounted guest memory device associated with guest memory 195A appears to application 160A as a physical storage device, for example, a peripheral interconnect ("PCI") device. In an example, guest memory 195A is configured to provide access to files in memory device 114 by implementing a virtual filesystem that exposes a section of a filesystem associated with host OS 118 and memory device 114 to guest 122. In the example, files referenced through the virtual filesystem associated with guest memory 195A may be accessed by guest 122 via file operations directed at file identifiers (e.g., file descriptors, file handles) of these referenced files. In some examples, the file request may additionally identify a part of a file on which the file operation is to be performed rather than a whole file, for example, via an offset value from the start of the file. In such examples, instead of a request to, for example, retrieve a whole file for access or modification, a segment of the file is identified and retrieved.

The storage controller translates the file request (block 315). In an example, storage controller 140 translates the operating system file request received by guest OS 196A into a virtual filesystem request in a format acceptable to FS daemon 130 (e.g., a FUSE request). For example, a file OPEN request may be translated to a FUSE_OPEN or FUSE_OPENDIR request, a file READ request may be translated to a FUSE_READ or FUSE_READDIR request, etc. The storage controller adds the translated file request to a filesystem queue (block 320). In an example, storage controller 140 also adds the translated file request (e.g., a virtual filesystem request) to FS queue 142. In an example, adding a the translated file request to FS queue 142 may include additional translation, for example, packaging the translated file request into a message envelope format acceptable to the transport protocol implemented for FS queue 142 (e.g., a Virtio message). In an example, multiple pluralities of queues may be implemented for message transport between storage controller 140 and FS daemon 130. For example, low priority queues (e.g., FS queue 142) may be implemented to handle file content requests (e.g., FUSE_READ, FUSE_WRITE, etc.), while high priority queues (e.g., FS queue 144) may be implemented to handle instructional requests (e.g., FUSE_INTERRUPT, etc.) and/or metadata requests (FUSE_GETATTR, FUSE_LOOKUP, etc.). For example, an interrupt command may be sent on FS queue 144 to stop a file content retrieval request sent via FS queue 142.

Typically, in UNIX® operating systems and their derivatives (e.g., Red Hat Enterprise Linux®, AIX®, Solaris®, etc.) everything that the operating system interacts with is defined as a type of file, including I/O devices and storage devices. I/O devices are typically exposed as character devices, which when read, display a continuous stream of characters. For example, a keyboard character device would display the characters typed on the keyboard. Buffering may be implemented to display whole messages rather than a stream of characters (e.g., for a network device that assembles multiple packets into one message). Block devices are typically storage devices that retrieve entire blocks or pages of data from a storage device at once. In a character device, data would be read as it is sent to the device (e.g., a second message may be interjected into the middle of a larger first message as an interrupting communication). In an example, communication between storage controller 140 and FS daemon 130 is routed through FS queues 142 and 144 rather than directly through a device file (e.g., a character or block device) as would be the case where FS daemon 130 were executing within guest 122. In such an example, because data in FS queues 142 and 144 are read sequentially as whole messages, a message that takes a long time to compose may block subsequent messages from appearing on the queue. For example, copying a large file into queue 142 may force any other commands being placed into the queue to be read after the queue message containing the file has been fully loaded into the queue. Therefore a high priority request from storage controller 140 to FS daemon 130 that is intended to interrupt a low priority request or to be executed before the low priority request cannot be sent via the same communication channel as a the low priority request. This means that, if the same communication channel were used (e.g., FS queue 142) an interrupting high priority request would not be received until the low priority request submitted to the queue before the high priority request finishes transmitting. Therefore a second queue (e.g., FS queue 144) may be implemented to support high priority requests. For example, if a file retrieval request is sent on FS queue 142, and the response with the contents of the file is returned by FS daemon 130 also on FS queue 142, sending a cancellation request on FS queue 142 while the FS daemon 130 is loading the retrieved file to FS queue 142 would be useless because the cancellation request would not be processed until after the file is loaded already. In an example, a processing efficiency optimization may include rerouting file requests that can be handled by metadata operations (e.g., without retrieving the contents of a file) to high priority queues so that requests to locate a file, acquire a lock on a file, or retrieve information such as modification time do not have to wait for an ongoing file content retrieval request to finish executing. In addition, interrupting commands (e.g., to cancel or terminate file access) may also be routed to higher priority queues.

A filesystem daemon in a hypervisor associated with the guest retrieves the translated file request from the filesystem queue (block 325). In an example, FS daemon 130 retrieves the translated file request (e.g., request 220) from FS queue 142 for processing. In the example, FS daemon 130 may unpack request 220 from a transport layer messaging protocol envelope to retrieve request contents for processing. In an example, FS daemon 130 may separately fulfill a high priority file request transmitted through FS queue 144 while in the process of fulfilling the file content request 220 transmitted through FS queue 142. For example, a multi-threaded FS daemon 130 may handle the two requests in parallel. In an example the high priority request may be fulfilled via a metadata operation (e.g., retrieving a file modification time of a second file). In an example, results of this second request may be supplied via high priority filesystem queue FS 144, or through a separate queue (e.g., FS queue 242). In an example, usage of separate queues for inbound and outbound communications between storage controller 140 and FS daemon 130 may reduce messaging contention in high volume systems.

The hypervisor provides access to a file in a host memory identified in the file request to the guest (block 330). In an example, FS daemon 130 requests file 230A from memory device 114 via hypervisor 120 in response to request 220 and access to file 230A (e.g., in the form of a copy as file 230B) is provided to guest 122. In an example, hypervisor 120 locates file 230A in memory device 114 or another memory device (e.g., DRAM, HDD, SSD, persistent memory) associated with host OS 118 based on a file identifier of file 230A associated with a file operation issued by FS daemon 130 to hypervisor 120. In an example, a supervisor of host 110 (e.g., host OS 118, hypervisor 120) may have access to FS queues 142, 144, and/or 242. In the example, hypervisor 120 may directly load data to FS queue 242 in response to a file request. In an example, storage controller 140 and FS daemon 130 may request and handle files on a file basis rather than a block or page basis. In the example, translation to and from handling file contents to block or page memory addresses may be handled by hypervisor 120. In an example, retrieved file 230A, or a requested portion of file 230A is loaded to a separate FS queue 242 for transmission to storage controller 140 for access by application 160A. In some systems, FS daemon 130 and/or hypervisor 120 may be additionally configured to directly map the host memory address of file 230A into the guest memory address space of guest 122 (e.g., in page table 148). In an example, FS daemon 130 issues a file request to a supervisor of host 110 (e.g., hypervisor 120 and/or host OS 118) which is handled by the supervisor by converting the file request (e.g., to access a file based on a file descriptor or file handle) into a memory request (e.g., to retrieve a block or page of memory). In an example, hypervisor 120 allocates a host memory location identified by a host memory address to store the requested file, which may be retrieved from persistent storage. For example, FS daemon 130 assigns a file descriptor to file 230A (possibly with an offset identifying a section of file 230A to be retrieved). In the example, FS daemon 130 may additionally instruct hypervisor 120 to map a host memory address of file 230 to a host virtual address (e.g., associated with FS daemon 130 or hypervisor 120) or to a guest memory address (e.g., GPA or GVA of guest 122). In such an example, guest 122 and application 160A may be provided direct access to modify the copy of file 230A in memory device 114 without creating a local copy in guest memory 195A, which may provide faster access. In an example, file 230A may reside in persistent storage (e.g., HDD, SSD) but not in random access memory. In such an example, file 230A may be associated with one or more host virtual addresses, but not necessarily a host physical address. In such an example, when FS daemon 130 requests that file 230A be mapped to guest memory 195A to provide direct access by guest 122 to file 230A, hypervisor 120 may map the host virtual address(es) of file 230A to guest physical addresses of guest 122 (e.g., in hypervisor page table 135), which may in turn be mapped to guest virtual address(es) in page table 148. In the example, when guest 122 attempts to access the guest virtual address, a page fault is triggered because file 230A does not reside in random access memory and is not yet associated with a host physical address. Host 110 (e.g., host OS 118, hypervisor 120) then handles the page fault by allocating one or more host physical addresses to file 230A, retrieves file 230A from persistent storage, and loads file 230A into the host physical addresses. In the example, with the page fault resolved, guest 122 accesses file 230A directly via the associated guest virtual addresses mapped to the guest physical addresses which are mapped to the host physical addresses of file 230A. However, allowing a guest to directly modify host memory may introduce additional security concerns and requires a higher level of trust between hypervisor 120 and guest supervisors (e.g., guest OS 196A). In addition, in some implementations higher performance may be achieved by opening files while bypassing page cache operations (e.g., FOPEN_DIRECT_IO). In an example, FS daemon 130 and/or hypervisor 120 may be configured to assess guest 122, guest OS 196A, and/or application 160A's access permissions to file 230A, and may reject the access request to file 230A based on a failed access permissions check. In an example, when guest 122 attempts to open file 230A, or when FS daemon 130 requests for file 230A to send file 230A to guest 122 (e.g., as file 230B), hypervisor 120 and/or host OS 118 determines whether or not FS daemon 130 has sufficient rights to open file 230A.

Figure 4:
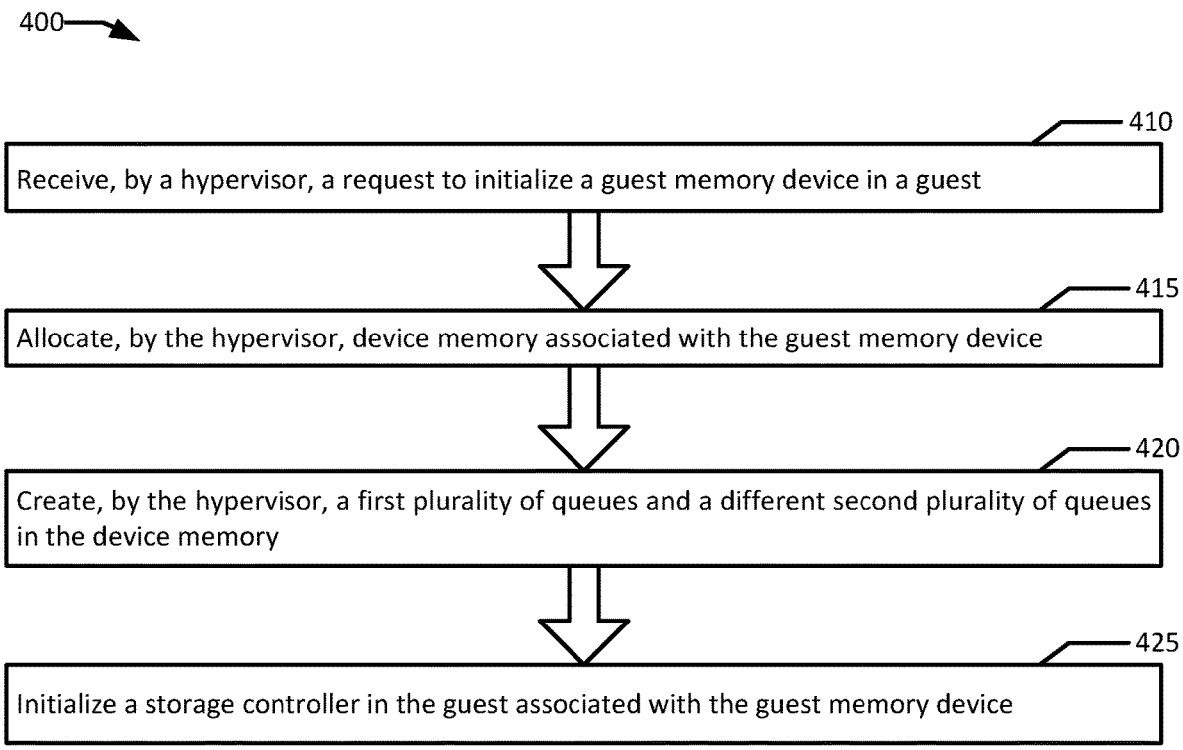
FIG. 4 is a flowchart illustrating an example of initializing secure and efficient access to host memory for a guest according to an example of the present disclosure.

FIG. 4 is a flowchart illustrating an example of initializing secure and efficient access to host memory for a guest according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by hypervisor 120.

Example method 400 may begin with a hypervisor receiving a request to initialize a guest memory device in a guest (block 410). In an example, the guest memory device (e.g., a virtual device hosting guest memory 195A) is configured to provide access to files in a host memory (e.g., memory device 114) to guest 122. In an example, a request to mount a virtual file system associated with memory device 114 to guest 122 may be received by hypervisor 120. In an example, requested guest memory 195A may be configured to appear to application 160A as a being provided through a PCI device.

The hypervisor allocates device memory associated with the guest memory device (block 415). In an example, hypervisor 120 reserves a section in host memory (e.g., memory device 114) as device memory 292A associated with a guest memory device that will be mounted to guest 122 provide storage as guest memory 195A to guest 122. In the example, the device memory 292A is reserved for virtual device usage, for example, for communications queues (e.g., FS queues 142, 144, 242) which will allow a storage controller (e.g., storage controller 140) of the new guest memory device to communicate with FS daemon 130 in hypervisor 120. In an example, page table 148 may also be stored in device memory 292A.

The hypervisor creates a first plurality of queues and a different second plurality of queues in the device memory (block 420). In an example, a filesystem daemon (e.g., FS daemon 130) of the hypervisor 120 is configured to receive messages from both the first plurality of queues (e.g., low priority queues, FS queues 142 and 242) and the second plurality of queues (e.g., high priority queues, FS 144). In an example, low priority queues (e.g., FS queues 142 and 242) handle file content requests, where the contents of a file are retrieved for processing, while high priority queues (e.g., FS queue 144) handle file operations requests (e.g., rename, move, delete a file, cancel a previous request, etc.) and/or metadata requests (e.g., requests fulfilled via metadata queries for directory listings, modification times, file existence, etc.) which do not require access to file contents. In an example, a later received file operations request or metadata request may be processed by FS daemon 130 before an earlier received file content request completes processing. In an example, FS daemon 130 is configured to receive messages placed in the FS queues 142, 144, and 242 in device memory 292A, and also configured to be permitted to place messages into these queues.

A storage controller associated with the guest memory device is initialized in the guest (block 425). In an example, the storage controller 140 is configured to receive messages from both the first plurality of queues and the second plurality of queues. In an example, storage controller 140 is also configured to send and receive messages through FS queues 142, 144, and/or 242. In an example, storage controller 140 executes in a kernel of guest 122 (e.g., guest OS 196A). In an example, storage controller may execute as a component of the virtualized guest memory device hosting guest memory 195A, or as a component of a driver of the virtualized guest memory device executing in guest OS 196A.

In an example, application 160A accesses the newly created and mounted guest memory 195A to retrieve a file 230A from memory device 114. In the example, FS daemon 130 receives the request (e.g., request 220) via FS queue 142. In the example, FS daemon 130 retrieves a copy of file 230A in conjunction with hypervisor 120, and places the file (or an identified segment of the file) into a separate queue (e.g., FS queue 242) that is also a low priority queue. In an example, using separate inbound and outbound queues speeds up communications between storage controller 140 and FS daemon 130. In an example, storage controller 140 retrieves the copy of file 230A (e.g., file 230B) from FS queue 242 to provide to application 160A. In an example, storage controller 140 first stores a copy of file 230B in virtual guest memory allocated to guest 122 prior to providing access to the "locally stored" copy of the file to application 160A. In an example, a copy on write operation may be utilized to conserve memory and storage throughput for creating the file 230B. In an example, FS daemon 130 and/or hypervisor 120 may directly map a host memory address of file 230A to page table 148 as a guest memory address accessible to guest OS 196A and/or storage controller 140. In the example, this mapping may be further exposed to application 160A. For example, a host physical address of file 230A is mapped and translated to a guest physical address of guest 122 (e.g., in hypervisor page table 135), and the guest physical address is mapped to a guest virtual address in page table 148, with access to the guest virtual address provided to application 160A. In such examples, allowing application 160A to directly access the copy of file 230A in memory device 114 may reduce latency and reduce memory capacity utilization by avoiding duplicate copies of file 230A from being created. In an example, this host memory address may additionally be mapped to guest 124 (e.g., via hypervisor page table 135 and page table 158) enabling guests 122 and 124 to share access to file 230A. In such an example, applications 160A-B may simultaneously read the same file and any changes to the file (e.g., file 230A) would be immediately reflected in both guests 122 and 124.

In an example, requests sent to high priority queues may be processed before earlier requests to low priority queues. For example, while FS daemon 130 is loading file 230B to FS queue 242, FS daemon 130 may receive a cancellation request via high priority FS queue 144 and in response, stop loading file 230B to FS queue 242. In an example, since the message containing file 230B does not finish loading into FS queue 242, storage controller 140 never receives the message or file 230B. In an example, memory used for file 230B may be reclaimed after the cancellation. In an example, other "fast" operations that do not require reading file contents, which may often be paged out into slower storage (e.g., HDD) metadata data requests and file operations that do not require loading file contents (e.g., renaming a file) may be prioritized ahead of file content requests. In an example, any request received by FS daemon 130 via low or high priority queues may be validated for execution rights prior to being executed.

Figure 5:
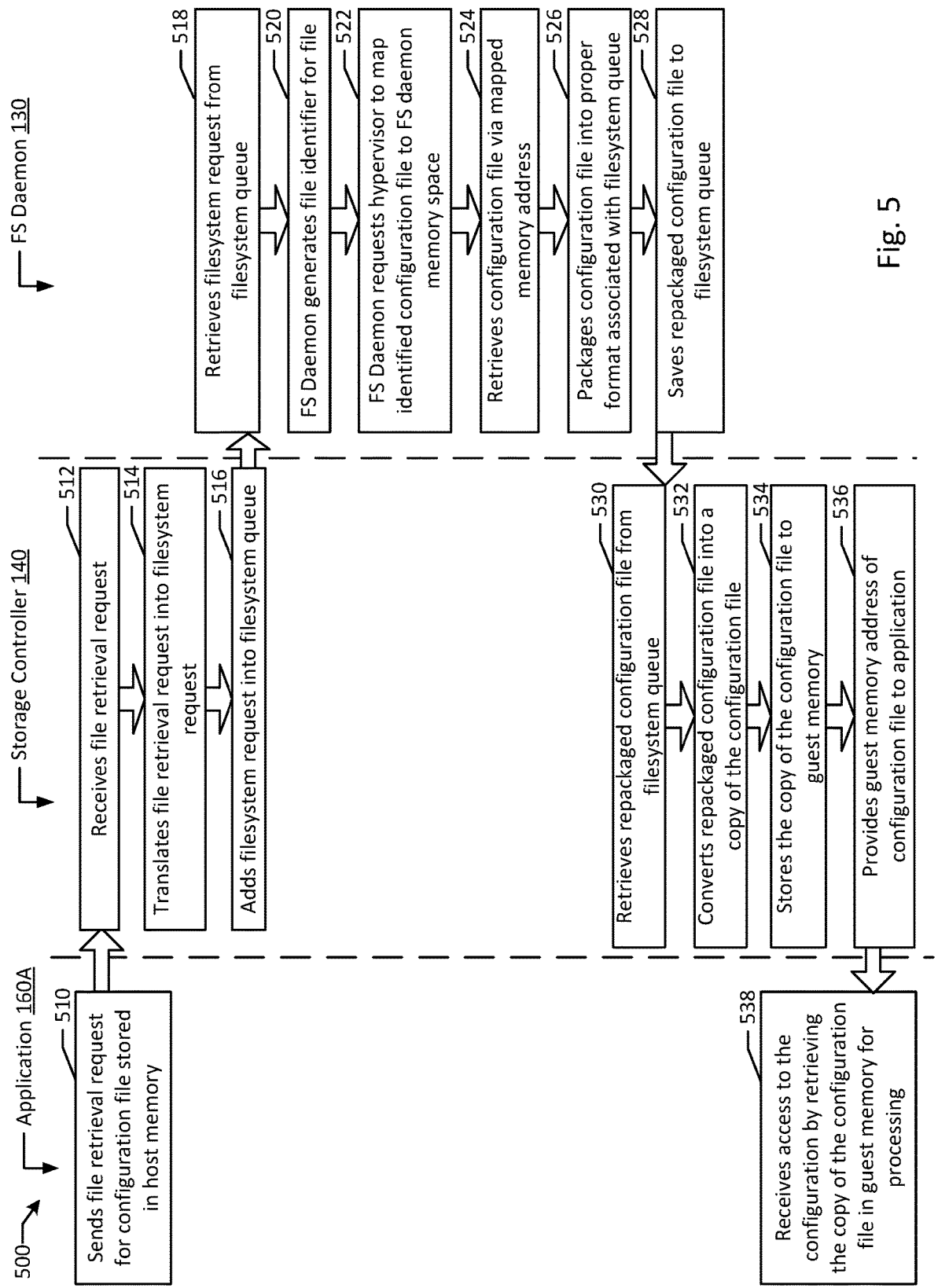
FIG. 5 is flow diagram of retrieving a file in host memory by a guest according to an example of the present disclosure.

FIG. 5 is flow diagram of retrieving a file in host memory by a guest according to an example of the present disclosure. Although the examples below are described with reference to the flow diagram illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, application 160A requests access to a file stored in memory device 114 via storage controller 140 and FS daemon 130.

In example system 500, application 160A sends a file retrieval request (e.g., a file OPEN request) for a configuration file stored in host memory (e.g., memory device 114) (block 510). In an example, the configuration file may be a shared configuration file for each copy of application 160A (e.g., applications 160A-B) executing on host 110, which may include, for example, host specific firewall settings. In an example, storage controller 140 receives the file retrieval request (block 512). In the example, storage controller 140 translates the file retrieval request into a filesystem request (e.g., from file OPEN to FUSE_OPEN) with any requisite syntax changes required (block 514). In an example, storage controller 140 adds the filesystem request (e.g., request 220) into a filesystem queue (e.g., FS queue 142) (block 516). In an example, further translation may be performed to put request 220 into a proper format for the transport protocol employed by FS queue 142 (e.g., Virtio).

In an example, FS daemon 130 retrieves request 220 from FS queue 142 (block 518). In the example, FS daemon 130 then generates a file identifier (e.g., file descriptor and/or inode) for configuration file based on request 220 (e.g., file 230A) (block 520). In an example, FS daemon 130 validates storage controller 140's access credentials for file 230A. FS daemon 130 requests hypervisor 120 to map configuration file 230A to a host virtual address associated with FS daemon 130 to allow FS daemon 130 to access file 230A (block 522). In an example, hypervisor 120 handles the memory translation request to locate the memory address of file 230A, mapping file 230A (e.g., via executing mmap( )) to the memory space of FS daemon 130. In an example, FS daemon 130 then retrieves a copy of configuration file 230A via the mapped memory address (block 524). FS daemon 130 then packages configuration file 230A into a format associated with FS queue 242 (e.g., Virtio message format) (block 526). FS daemon 130 then saves the repackaged configuration file 230B to FS queue 242 (block 528).

Storage controller 140 may be configured to subscribe to memory updates to device memory 292A and/or FS queues 142, 144, and 242. These update notifications may be from host OS 118, hypervisor 120, guest OS 196A, or from memory device 114. In an example, storage controller 140 receives such an update and in response, retrieves the repackaged configuration file 230B from FS queue 242 (block 530). In an example, storage controller 140 converts the repacked configuration file 230B into a copy of the configuration file for access to application 160A (block 532).

In an example, configuration file 230B is unpacked from a transport layer messaging protocol envelope. A copy of configuration file 230B is made to guest memory 195A for access by application 160A (e.g., with a copy on write operation to guest memory 195A) (block 534). In an example, storage controller 140 provides a guest memory address of the copy of configuration file 230B in guest memory 195A to application 160A (block 536). In the example, application 160A receives access to the configuration file by retrieving the copy of the configuration file 230B stored in guest memory 195A for processing (block 538). In an example, application 160A updates the configuration file and commits the change. In the example, upon verifying that application 160A and guest 122 is permitted to modify the configuration file 230A in memory device 114, the change is committed by hypervisor 120 to physical storage. For example, a FUSE_FLUSH command may be issued to FS daemon 130 causing FS daemon 130 to instruct the hypervisor 120 to flush CPU caches in CPU 112 and to commit changes to memory device 114 (e.g., via calling msync( ), fsync( ), etc.). In an example, FS daemon 130 issues a synchronization request to a supervisor of host 110 (e.g., hypervisor 120, host OS 118) associated with the updated file 230 (e.g., via a file identifier, file descriptor, file handle, etc.). In the example, the synchronization request (e.g., fsync( ), fdatasync( )) causes the supervisor to transfer the updates from a transient memory (e.g., random access memory, CPU cache, etc.) to a persistent storage volume (e.g., HDD, SSD, persistent memory). In an example, FS daemon 130 issues a memory synchronization request that includes a change freeze operation to prevent conflicting data updates and a durability operation to commit requested data updates (e.g., a "fence" operation). For example, a memory synchronization operation (e.g., msync) may issue a flush command to ensure that any contents in the CPU cache of CPU 112 are moved to persistent memory (e.g., memory device 114), and then issue a fence command to prevent any other updates to the memory page updated by guest 122 until after all necessary metadata updates are complete. In the example, application 160B that is executing on guest 124 is also utilizing configuration file 230A, and application 160B is reconfigured based on the update to configuration file 230A made by application 160A.

Figure 6:
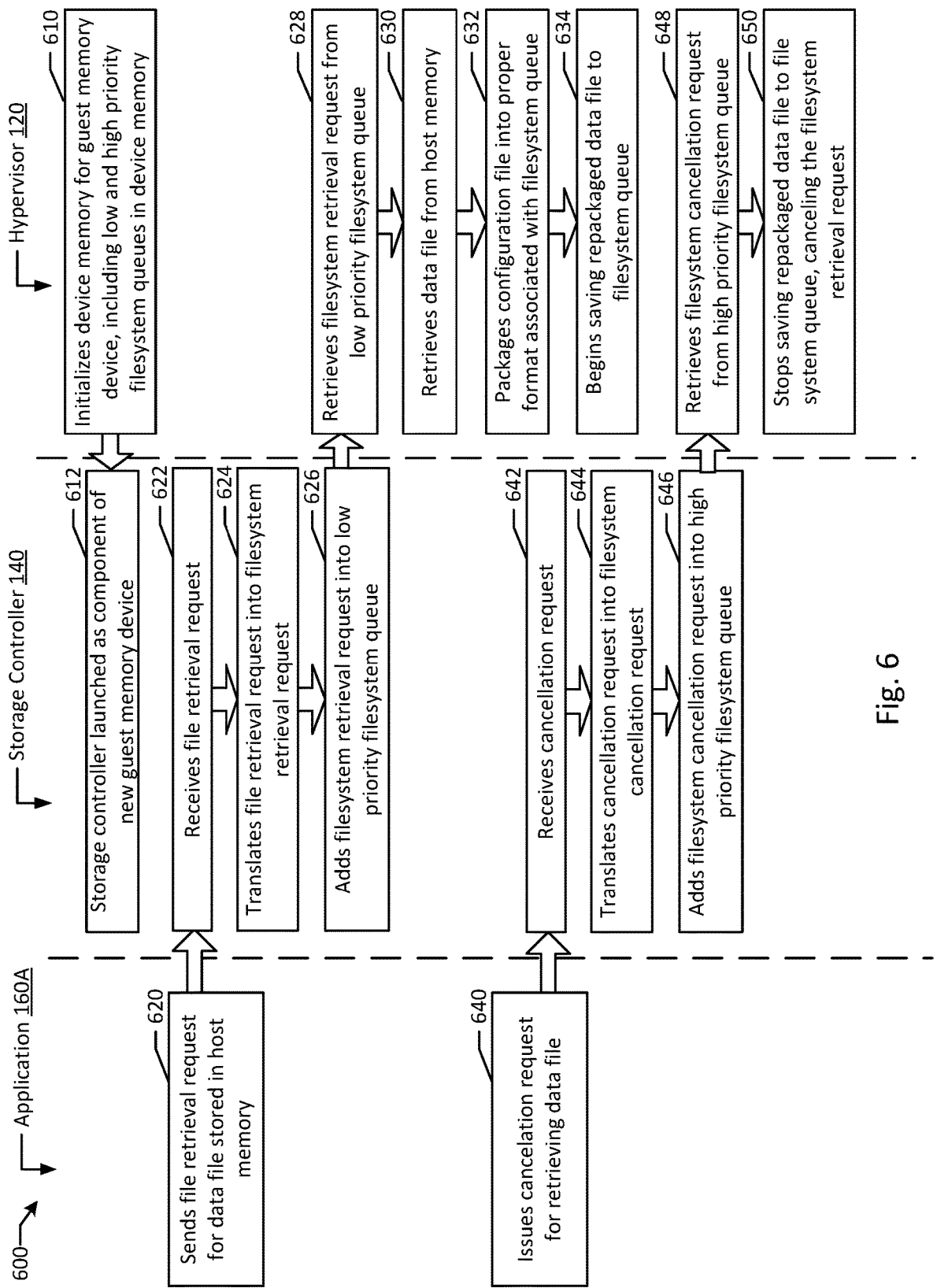
FIG. 6 is flow diagram of interrupting file retrieval from host memory by a guest according to an example of the present disclosure.

FIG. 6 is flow diagram of interrupting file retrieval from host memory by a guest according to an example of the present disclosure. Although the examples below are described with reference to the flow diagram illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, application 160A requests access to a file stored in memory device 114 via storage controller 140 and hypervisor 120, and application 160A later cancels the request.

In example system 600, hypervisor 120 receives a request to initialize device memory 292A for a guest memory device associated with guest memory 195A, including initializing low priority FS queues 142 and 242 and high priority FS queue 144 in the device memory 292A (block 610). In an example, storage controller 140 is initialized in guest 122 in conjunction with the device memory initialization provided by hypervisor 120. For example, storage controller 140 is launched as a component of a memory device driver on guest 122 (e.g., similar to memory device driver 156 on guest 124) (block 612).

In an example, application 160A executing on guest 122 sends a file retrieval request for a data file (e.g., file 230A) stored in host memory (e.g., memory device 114) (block 620). Storage controller 140 receives the file retrieval request (block 622). For example, application 160A invokes a file operation that guest OS 196A interprets as a request to access data in guest memory 195A (e.g., a virtual filesystem exposing files in memory device 114 to guest 122). In an example, storage controller 140 translates the file retrieval request (e.g., operating system file operation) into a filesystem retrieval request (e.g., a virtual file system file operation) (block 624). This translated filesystem retrieval request is added to low priority FS queue 142 by storage controller 140 so that it will be received by FS daemon 130 (block 626). In an example, FS daemon 130 in hypervisor 120 retrieves the filesystem retrieval request (e.g., request 220) from low priority FS queue 142 (block 628). In some examples, FS daemon 130 is implemented within hypervisor 120. In other examples, FS daemon 130 may be implemented in any component of system 100 where FS daemon 130 would have access to memory device 114, for example, in host OS 118. FS daemon 130 may also be a component of memory device 114 or a device driver of memory device 114, for example, executing in host OS 118. In an example, FS daemon 130 retrieves data file 230A from memory device 114 (block 630). FS daemon 130 then packages data file 230A into a format associated with FS queue 142 (e.g., Virtio message) (block 632). In an example, FS daemon 130 begins saving the repackaged data file as file 230B in FS queue 242 (block 634).

In an example, after initiating the request to retrieve the data file application 160A issues a cancellation request for retrieving the data file (block 640). For example, the data file 230A may be a very large file that will take substantial time to retrieve. In the example, application 160A may identify a segment of data file 230A to retrieve instead of the whole file, and may therefore cancel retrieving the whole file to save on both latency and memory capacity (e.g., from avoiding caching the data file for access). In an example, while hypervisor 120 is retrieving locating or FS daemon 130 is retrieving, repackaging, or queuing file 230A, storage controller 140 receives the cancellation request (block 642). In an example, a cancellation request is processed as an interrupt by guest OS 196A, and quickly sent to storage controller 140 which receives the cancellation request and immediately acts on the cancellation request. In the example, storage controller 140 translates the cancellation request into a filesystem cancellation request accepted by FS daemon 130 (block 644). In an example, storage controller 140 packages the filesystem cancellation request for transmission via FS queue 144 (e.g., a high priority filesystem queue) and adds the filesystem cancellation request to FS queue 144 (block 646). FS daemon 130 then receives the filesystem cancellation request from high priority FS queue 144 (block 648). In response, FS daemon 130 interrupts and terminates the previous file retrieval request. FS daemon stops saving repackaged data file 230B to FS queue 242, thereby cancelling the filesystem retrieval request (block 650). In an example, FS daemon 130 additionally instructs hypervisor 120 to reclaim the memory used in FS queue 242 to buffer data file 230B. For example, the memory addresses may first be flagged as available and when FS queue 242 is again required for transmitting a new data file, the memory addresses may be overwritten. In an example, available addresses that have been previously used may be lazily overwritten and replaced with ones or zeros to keep unused data from being retrieved.

Figure 7:
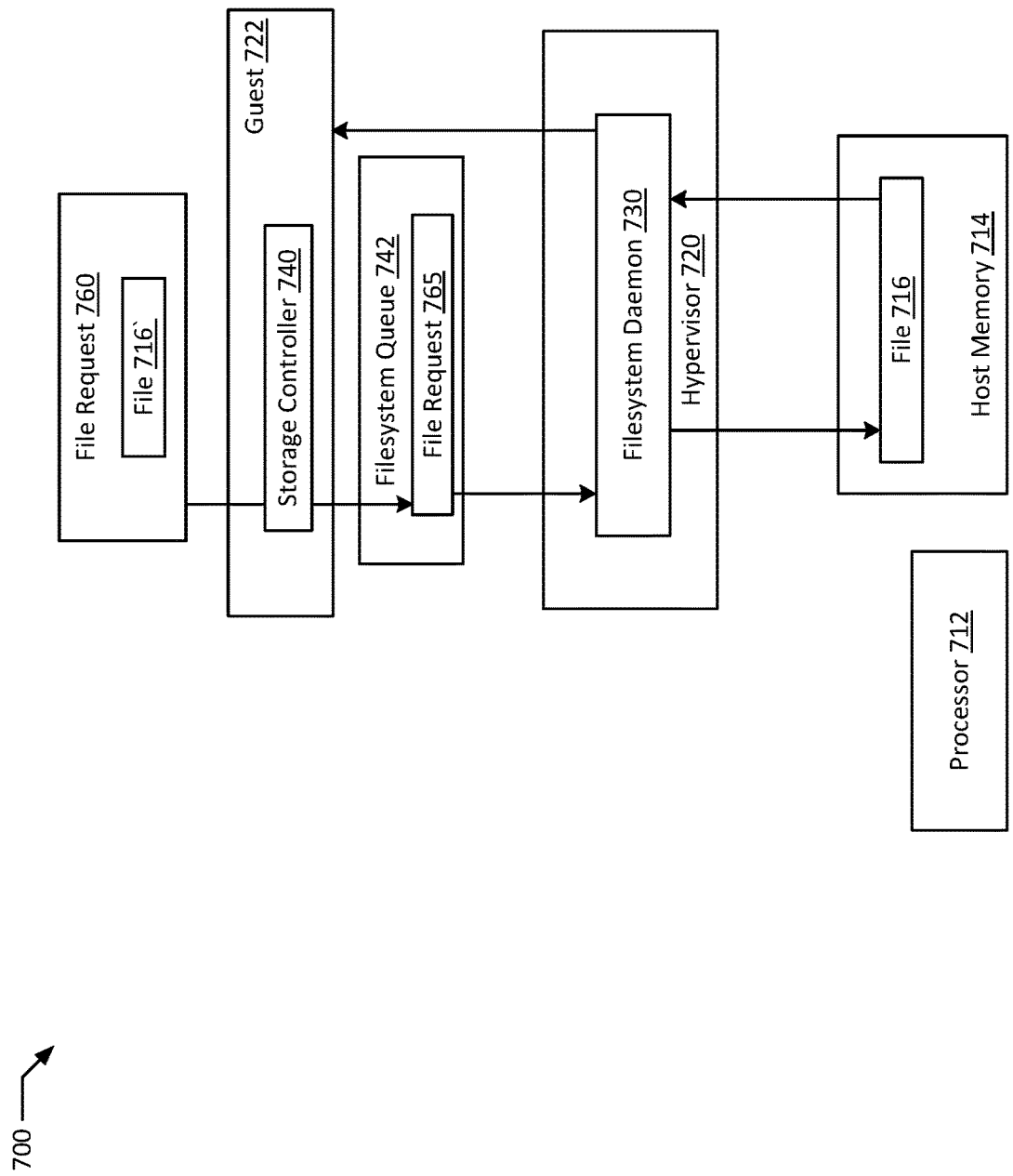
FIG. 7 is a block diagram of an example system retrieving a file in host memory by a guest according to an example of the present disclosure.

FIG. 7 is a block diagram of an example system retrieving a file in host memory by a guest according to an example of the present disclosure. Example system 700 includes a processor 712, a host memory 714, a hypervisor 720 including a filesystem daemon 730, a guest 722 including a storage controller 740, and a filesystem queue 742. Storage controller 740 is configured to receive file request 760, and then translate file request 760 into file request 765, which is then added to filesystem queue 742. The filesystem daemon 730 is configured to retrieve translated file request 765 from filesystem queue 742 and in to provide access to file 716 in host memory 714 identified in file request 760 as file 716' to guest 722.

Figure 8:
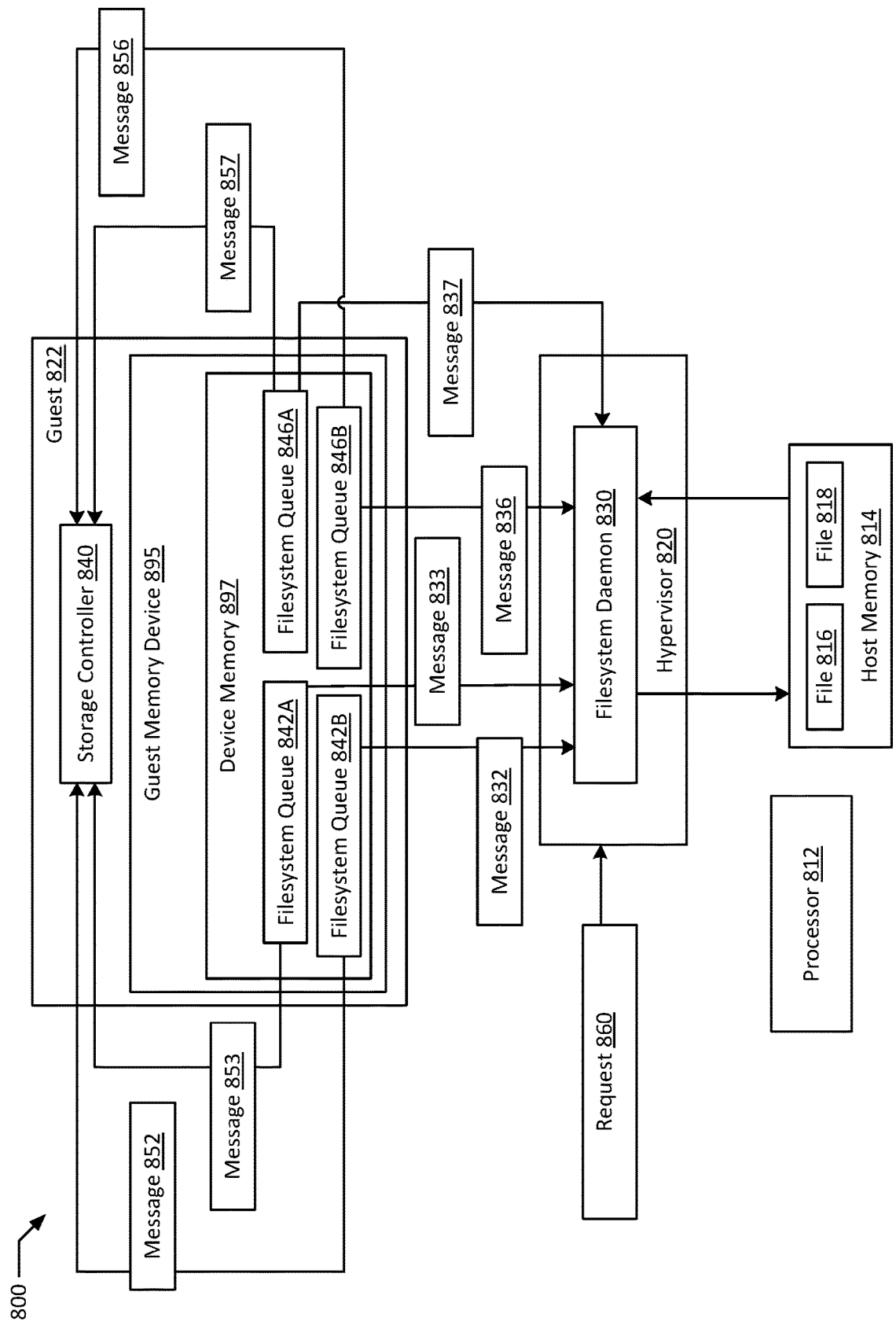
FIG. 8 is a block diagram of an example system initializing secure and efficient access to host memory for a guest according to an example of the present disclosure.

FIG. 8 is a block diagram of an example system initializing secure and efficient access to host memory for a guest according to an example of the present disclosure. Example system 800 includes a processor 812, a host memory 814, a hypervisor 820 including a filesystem daemon 830, a guest 822. The hypervisor 820 is configured to receive request 860 to initialize guest memory device 895 in guest 822, where guest memory device 895 is configured to provide access to files 816 and 818 in host memory 814 to guest 822. Hypervisor 820 allocates device memory 897 associated with guest memory device 895. Hypervisor 820 creates queues 842A and 842B, as well as queues 846A and 846B, where filesystem daemon 830 is configured to receive messages 832, 833, 836, and 837 from queues 842A-B and 846A-B. Storage controller 840 is initialized on guest 822, and associated with guest memory device 895, where storage controller 840 is configured to receive messages 852, 853, 856, and 857 from queues 842A-B and 846A-B.

Secure and efficient access to host memory for guests as described in the present disclosure enables fast data exchange between guests and their host as well as between guests on the same host in a manner that is both faster and more extensible than is available using networking protocols. By implementing queues accessible to both guests and their hosts, while restricting messages in those queues to messages of certain restricted types, file operations may be passed from guest to host without requiring the guest to have any heightened access or control over the host. Where multiple guests share the same file in host memory, the file sharing may be additionally used as a very fast communication channel between the two guests, since changes to the file are reflected to all of the guests accessing the file simultaneously. A quick notification between guests that the file has been updated, or an alert from the kernel that the file has been updated would make all of the guests aware of the change, thereby triggering any necessary additional computational steps with the updated file. From the host's perspective, sending a file to a guest via the methods described in the present disclosure would be similar to sending the file over a networking protocol because memory access is still controlled by the hypervisor. Therefore unauthorized access may still be stopped by the hypervisor. As a result, processing tasks in shared environments are more efficient due to less latency from file sharing operations between guests and hosts, and therefore higher compute utilization may be advantageously achieved.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: (i) a processor, (ii) a host memory, (iii) a hypervisor including a filesystem daemon, (iv) a guest including a storage controller, and (v) a first filesystem queue, wherein the storage controller is configured to: receive a first file request; translate the first file request; and add the translated first file request to a first filesystem queue, wherein the filesystem daemon is configured to: retrieve the translated first file request from the first filesystem queue; and provide access to a first file in the host memory identified in the first file request to the guest.

In accordance with a 2nd exemplary aspect of the present disclosure, which may be used in combination with any one or more of other aspects described herein (e.g., the 1st aspect), wherein the first file request includes an identifier of an identified part of the first file to be accessed, and the filesystem daemon is configured to: retrieve a segment of the first file that includes the identified part; and send the segment to the guest. In accordance with a 3rd exemplary aspect of the present disclosure, which may be used in combination with any one or more of other aspects described herein (e.g., the 2nd aspect), wherein the segment is transferred via a second filesystem queue.

In accordance with a 4th exemplary aspect of the present disclosure, which may be used in combination with any one or more of other aspects described herein (e.g., the 1st aspect), wherein the first filesystem queue is a low priority queue and a second filesystem queue is a high priority queue, and wherein low priority queues handle file content requests and high priority queues handle at least one of instructional requests and metadata requests. In accordance with a 5th exemplary aspect of the present disclosure, which may be used in combination with any one or more of other aspects described herein (e.g., the 4th aspect), wherein a second file request, which is a file content request, is received by the filesystem daemon via the first filesystem queue, and the filesystem daemon is configured to: retrieve a second file from the host memory in response to the second file request; begin loading the second file into the first filesystem queue for access by the guest; receive a cancellation request via the second filesystem queue; and responsive to receiving the cancellation request, stop loading the second file into the first filesystem queue. In accordance with a 6th exemplary aspect of the present disclosure, which may be used in combination with any one or more of other aspects described herein (e.g., the 4th aspect), wherein a metadata request to retrieve metadata related to a second file is received by the filesystem daemon via the second filesystem queue while the filesystem daemon is handling the first file request, and the metadata is provided to the guest before access to the first file is provided to the guest.

In accordance with a 7th exemplary aspect of the present disclosure, which may be used in combination with any one or more of other aspects described herein (e.g., the 1st aspect), wherein the storage controller is a component of one of (i) a guest memory device in the guest and (ii) a driver of the guest memory device, the first file request is a file content request to access a contents of the first file stored in the guest memory device, and wherein the guest memory device is configured to provide access to files stored in the host memory. In accordance with an 8th exemplary aspect of the present disclosure, which may be used in combination with any one or more of other aspects described herein (e.g., the 7th aspect), wherein the guest memory device appears to applications executing on the guest as a physical storage device.

In accordance with a 9th exemplary aspect of the present disclosure, which may be used in combination with any one or more of other aspects described herein (e.g., the 1st aspect), wherein the first filesystem queue is accessible to a supervisor of a host of the guest. In accordance with a 10th exemplary aspect of the present disclosure, which may be used in combination with any one or more of other aspects described herein (e.g., the 1st aspect), wherein the hypervisor is configured to map a host memory address associated with the first file to a guest memory address in the guest, and wherein the guest directly accesses the first file in the host memory via the guest memory address. In accordance with a 11th exemplary aspect of the present disclosure, which may be used in combination with any one or more of other aspects described herein (e.g., the 1st aspect), wherein one of the filesystem daemon and the hypervisor rejects a second file request to access a second file based on access permissions associated with the second file.

Aspects of the subject matter described herein may be useful alone or in combination with one or more other aspects described herein. In a 12th exemplary aspect of the present disclosure, a system comprises a means for receiving, by a storage controller in a guest, a first file request; a means for translating, by the storage controller, the first file request; a means for adding, by the storage controller, the translated first file request to a first filesystem queue; a means for retrieving, by a filesystem daemon in a hypervisor associated with the guest; the translated first file request from the first filesystem queue; and a means for providing, by the hypervisor, access to a first file in a host memory identified in the first file request to the guest.

Aspects of the subject matter described herein may be useful alone or in combination with one or more other aspects described herein. In a 13th exemplary aspect of the present disclosure, a computer-readable non-transitory storage medium storing executable instructions, which when executed by a computer system, cause the computer system to: receive, by a storage controller in a guest, a first file request; translate, by the storage controller, the first file request; add, by the storage controller, the translated first file request to a first filesystem queue; retrieve, by a filesystem daemon in a hypervisor associated with the guest, the translated first file request from the first filesystem queue; and provide, by the hypervisor, access to a first file in a host memory identified in the first file request to the guest.

Aspects of the subject matter described herein may be useful alone or in combination with one or more other aspects described herein. In a 14th exemplary aspect of the present disclosure, a method comprises receiving, by a storage controller in a guest, a first file request; translating, by the storage controller, the first file request; adding, by the storage controller, the translated first file request to a first filesystem queue; retrieving, by a filesystem daemon in a hypervisor associated with the guest, the translated first file request from the first filesystem queue; and providing, by the hypervisor, access to a first file in a host memory identified in the first file request to the guest.

In accordance with a 15th exemplary aspect of the present disclosure, which may be used in combination with any one or more of other aspects described herein (e.g., the 12th, 13th, or 14th aspects), wherein the first file request includes an identifier of an identified part of the first file to be accessed, and the filesystem daemon is configured to: retrieve a segment of the first file that includes the identified part; and send the segment to the guest. In accordance with a 16th exemplary aspect of the present disclosure, which may be used in combination with any one or more of other aspects described herein (e.g., the 15th aspect), wherein the segment is transferred via a second filesystem queue.

In accordance with a 17th exemplary aspect of the present disclosure, which may be used in combination with any one or more of other aspects described herein (e.g., the 12th, 13th, or 14th aspects), wherein the first filesystem queue is a low priority queue and a second filesystem queue is a high priority queue, and wherein low priority queues handle file content requests and high priority queues handle at least one of instructional requests and metadata requests. In accordance with an 18th exemplary aspect of the present disclosure, which may be used in combination with any one or more of other aspects described herein (e.g., the 17th aspect), wherein a second file request, which is a file content request, is received by the filesystem daemon via the first filesystem queue, and the filesystem daemon is configured to: retrieve a second file from the host memory in response to the second file request; begin loading the second file into the first filesystem queue for access by the guest; receive a cancellation request via the second filesystem queue; and responsive to receiving the cancellation request, stop loading the second file into the first filesystem queue. In accordance with a 19th exemplary aspect of the present disclosure, which may be used in combination with any one or more of other aspects described herein (e.g., the 17th aspect), wherein a metadata request to retrieve metadata related to a second file is received by the filesystem daemon via the second filesystem queue while the filesystem daemon is handling the first file request, and the metadata is provided to the guest before access to the first file is provided to the guest.

In accordance with a 20th exemplary aspect of the present disclosure, which may be used in combination with any one or more of other aspects described herein (e.g., the 12th, 13th, or 14th aspects), wherein the storage controller is a component of one of (i) a guest memory device in the guest and (ii) a driver of the guest memory device, the first file request is a file content request to access a contents of the first file stored in the guest memory device, and wherein the guest memory device is configured to provide access to files stored in the host memory. In accordance with a 21st exemplary aspect of the present disclosure, which may be used in combination with any one or more of other aspects described herein (e.g., the 20th aspect), wherein the guest memory device appears to applications executing on the guest as a physical storage device.

In accordance with a 22nd exemplary aspect of the present disclosure, which may be used in combination with any one or more of other aspects described herein (e.g., the 12th, 13th, or 14th aspects), wherein the first filesystem queue is accessible to a supervisor of a host of the guest. In accordance with a 23rd exemplary aspect of the present disclosure, which may be used in combination with any one or more of other aspects described herein (e.g., the 12th, 13th, or 14th aspects), wherein one of the filesystem daemon and the hypervisor rejects a second file request to access a second file based on access permissions associated with the second file.

Aspects of the subject matter described herein may be useful alone or in combination with one or more other aspects described herein. In a 24th exemplary aspect of the present disclosure, a system comprises (i) a processor, (ii) a host memory, (iii) a hypervisor including a filesystem daemon, and (iv) a guest, wherein the hypervisor is configured to: receive a request to initialize a guest memory device in the guest, wherein the guest memory device is configured to provide access to files in the host memory to the guest; allocate device memory associated with the guest memory device; create a first plurality of queues and a different second plurality of queues in the device memory, wherein the filesystem daemon is configured to receive messages from both the first plurality of queues and the second plurality of queues; and initialize a storage controller in the guest associated with the guest memory device, wherein the storage controller is configured to receive messages from both the first plurality of queues and the second plurality of queues.

In accordance with a 25th exemplary aspect of the present disclosure, which may be used in combination with any one or more of other aspects described herein (e.g., the 24th aspect), wherein the first plurality of queues are low priority queues and the second plurality of queues are high priority queues, and wherein low priority queues handle file content requests and high priority queues handle at least one of file operations requests and metadata requests. In accordance with a 26th exemplary aspect of the present disclosure, which may be used in combination with any one or more of other aspects described herein (e.g., the 25th aspect), wherein a first file content request is received by the filesystem daemon via a first queue of the first plurality of queues, and the filesystem daemon is configured to: retrieve a first file from the host memory in response to the first file content request; and load the first file into a second queue of the first plurality of queues for access by the guest. In accordance with a 27th exemplary aspect of the present disclosure, which may be used in combination with any one or more of other aspects described herein (e.g., the 26th aspect), wherein the filesystem daemon receives a cancellation request via the second plurality of queues while loading the first file into the second queue; and responsive to receiving the cancellation request, the filesystem daemon stops loading the second file into the first filesystem queue. In accordance with a 28th exemplary aspect of the present disclosure, which may be used in combination with any one or more of other aspects described herein (e.g., the 26th aspect), wherein a metadata request to retrieve metadata related to a second file is received by the filesystem daemon via the second plurality of queues while the filesystem daemon is handling the first file content request, and the metadata is provided to the guest before access to the first file is provided to the guest.

In accordance with a 29th exemplary aspect of the present disclosure, which may be used in combination with any one or more of other aspects described herein (e.g., the 24th aspect), wherein a first file content request includes an identifier of an identified part of a first file to be accessed, and the filesystem daemon is configured to: retrieve a segment of the first file that includes the identified part from the host memory; and send the segment to the guest via the first plurality of queues. In accordance with a 30th exemplary aspect of the present disclosure, which may be used in combination with any one or more of other aspects described herein (e.g., the 24th aspect), wherein the guest storage device appears to be a peripheral component interconnect device to applications on the guest. In accordance with a 31st exemplary aspect of the present disclosure, which may be used in combination with any one or more of other aspects described herein (e.g., the 24th aspect), wherein the hypervisor is configured to map a host memory address associated with the first file to a guest memory address in the guest, and wherein the guest directly accesses the first file in the host memory via the guest memory address. In accordance with a 32nd exemplary aspect of the present disclosure, which may be used in combination with any one or more of other aspects described herein (e.g., the 24th aspect), wherein one of the filesystem daemon and the hypervisor rejects a file content request to access a file based on access permissions associated with the file.

Aspects of the subject matter described herein may be useful alone or in combination with one or more other aspects described herein. In a 33rd exemplary aspect of the present disclosure, a system comprises a means for receiving, by a hypervisor, a request to initialize a guest memory device in a guest, wherein the guest memory device is configured to provide access to files in a host memory to the guest; a means for allocating, by the hypervisor, device memory associated with the guest memory device; a means for creating, by the hypervisor, a first plurality of queues and a different second plurality of queues in the device memory, wherein a filesystem daemon of the hypervisor is configured to receive messages from both the first plurality of queues and the second plurality of queues; and a means for initializing a storage controller in the guest associated with the guest memory device, wherein the storage controller is configured to receive messages from both the first plurality of queues and the second plurality of queues.

Aspects of the subject matter described herein may be useful alone or in combination with one or more other aspects described herein. In a 34th exemplary aspect of the present disclosure, a computer-readable non-transitory storage medium storing executable instructions, which when executed by a computer system, cause the computer system to: receive, by a hypervisor, a request to initialize a guest memory device in a guest, wherein the guest memory device is configured to provide access to files in a host memory to the guest; allocate, by the hypervisor, device memory associated with the guest memory device; create, by the hypervisor, a first plurality of queues and a different second plurality of queues in the device memory, wherein a filesystem daemon of the hypervisor is configured to receive messages from both the first plurality of queues and the second plurality of queues; and initialize a storage controller in the guest associated with the guest memory device, wherein the storage controller is configured to receive messages from both the first plurality of queues and the second plurality of queues.

Aspects of the subject matter described herein may be useful alone or in combination with one or more other aspects described herein. In a 35th exemplary aspect of the present disclosure, a method comprises receiving, by a hypervisor, a request to initialize a guest memory device in a guest, wherein the guest memory device is configured to provide access to files in a host memory to the guest; allocating, by the hypervisor, device memory associated with the guest memory device; creating, by the hypervisor, a first plurality of queues and a different second plurality of queues in the device memory, wherein a filesystem daemon of the hypervisor is configured to receive messages from both the first plurality of queues and the second plurality of queues; and initializing a storage controller in the guest associated with the guest memory device, wherein the storage controller is configured to receive messages from both the first plurality of queues and the second plurality of queues.

In accordance with a 36th exemplary aspect of the present disclosure, which may be used in combination with any one or more of other aspects described herein (e.g., the 33rd, 34th, or 35th aspects), wherein the first plurality of queues are low priority queues and the second plurality of queues are high priority queues, and wherein low priority queues handle file content requests and high priority queues handle at least one of file operations requests and metadata requests. In accordance with a 37th exemplary aspect of the present disclosure, which may be used in combination with any one or more of other aspects described herein (e.g., the 36th aspect), wherein a first file content request is received by the filesystem daemon via a first queue of the first plurality of queues, and the filesystem daemon is configured to: retrieve a first file from the host memory in response to the first file content request; and load the first file into a second queue of the first plurality of queues for access by the guest. In accordance with a 38th exemplary aspect of the present disclosure, which may be used in combination with any one or more of other aspects described herein (e.g., the 37th aspect), wherein the filesystem daemon receives a cancellation request via the second plurality of queues while loading the first file into the second queue; and responsive to receiving the cancellation request, the filesystem daemon stops loading the second file into the first filesystem queue. In accordance with a 39th exemplary aspect of the present disclosure, which may be used in combination with any one or more of other aspects described herein (e.g., the 37th aspect), wherein a metadata request to retrieve metadata related to a second file is received by the filesystem daemon via the second plurality of queues while the filesystem daemon is handling the first file content request, and the metadata is provided to the guest before access to the first file is provided to the guest.

In accordance with a 40th exemplary aspect of the present disclosure, which may be used in combination with any one or more of other aspects described herein (e.g., the 33rd, 34th, or 35th aspects), wherein a first file content request includes an identifier of an identified part of a first file to be accessed, and the filesystem daemon is configured to: retrieve a segment of the first file that includes the identified part from the host memory; and send the segment to the guest via the first plurality of queues. In accordance with a 41st exemplary aspect of the present disclosure, which may be used in combination with any one or more of other aspects described herein (e.g., the 33rd, 34th, or 35th aspects), wherein the guest storage device appears to be a peripheral component interconnect device to applications on the guest. In accordance with a 42nd exemplary aspect of the present disclosure, which may be used in combination with any one or more of other aspects described herein (e.g., the 33rd, 34th, or 35th aspects), wherein the hypervisor is configured to map a host memory address associated with the first file to a guest memory address in the guest, and wherein the guest directly accesses the first file in the host memory via the guest memory address. In accordance with a 43rd exemplary aspect of the present disclosure, which may be used in combination with any one or more of other aspects described herein (e.g., the 33rd, 34th, or 35th aspects), wherein one of the filesystem daemon and the hypervisor rejects a file content request to access a file based on access permissions associated with the file.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   (i) a processor, (ii) a host memory, (iii) a hypervisor including a filesystem daemon, and (iv) a guest including a storage controller and a first filesystem queue,
   wherein the storage controller of the guest is configured to:
      receive a first file request;
      translate the first file request by at least converting the first file request into a first filesystem request in a format associated with a virtualized networking protocol and accepted by the filesystem daemon, wherein the converting comprises packing the first filesystem request in a message envelope based on the virtualized networking protocol compatible with the first filesystem queue, wherein the virtualized networking protocol comprises a paravirtualization protocol; and
      add the first filesystem request to the first filesystem queue, wherein the filesystem daemon of the hypervisor is configured to:
         retrieve the first filesystem request from the first filesystem queue; and
         provide access to a first file in the host memory identified in the first file request to the guest, and
      wherein the filesystem daemon is outside a userspace of the guest,
   wherein the hypervisor is configured to:
      map a host memory address associated with the first file to a guest memory address in the guest prior to loading the first file into the host memory at the host memory address, and
      load the first file into the host memory, thereby resolving a page fault caused by the guest attempting to access the guest memory address.

2. The system of claim 1, wherein the first file request includes an identifier of an identified part of the first file to be accessed, and the filesystem daemon is configured to:
   retrieve a segment of the first file that includes the identified part; and
   send the segment to the guest.

3. The system of claim 1, wherein the first filesystem queue is a low priority queue and a second filesystem queue is a high priority queue, and wherein low priority queues handle file content requests and high priority queues handle at least one of instructional requests and metadata requests.

4. The system of claim 3, wherein a second file request, which is a file content request, is received by the filesystem daemon via the first filesystem queue, and the filesystem daemon is configured to:
   retrieve a second file from the host memory in response to the second file request;
   begin loading the second file into the first filesystem queue for access by the guest;
   receive a cancellation request via the second filesystem queue; and
   responsive to receiving the cancellation request, stop loading the second file into the first filesystem queue.

5. The system of claim 3, wherein a metadata request to retrieve metadata related to a second file is received by the filesystem daemon via the second filesystem queue while the filesystem daemon is handling the first file request, and the metadata is provided to the guest before access to the first file is provided to the guest.

6. The system of claim 1, wherein the storage controller is a component of one of (i) a guest memory device in the guest and (ii) a driver of the guest memory device, the first file request is a file content request to access content of the first file stored in the guest memory device, and wherein the guest memory device is configured to provide access to files stored in the host memory.

7. The system of claim 6, wherein the guest memory device appears to applications executing on the guest as a physical storage device.

8. The system of claim 1, wherein the first filesystem queue is accessible to a supervisor of a host of the guest.

9. The system of claim 1, wherein one of the filesystem daemon and the hypervisor rejects a second file request to access a second file based on access permissions associated with the second file.

10. A method comprising:
    providing (i) a processor, (ii) a host memory, (iii) a hypervisor including a filesystem daemon, and (iv) a guest including a storage controller and a first filesystem queue;
    receiving, by the storage controller in the guest, a first file request;
    translating, by the storage controller of the guest, the first file request by at least converting the first file request into a first filesystem request in a format associated with a virtualized networking protocol and accepted by the filesystem daemon in the hypervisor, wherein the converting comprises packing the first filesystem request in a message envelope based on the virtualized networking protocol compatible with the first filesystem queue, wherein the virtualized networking protocol comprises a paravirtualization protocol;
    adding, by the storage controller, the first filesystem request to the first filesystem queue;
    retrieving, by the filesystem daemon in the hypervisor associated with the guest, the first filesystem request from the first filesystem queue, wherein the filesystem daemon is outside a userspace of the guest;
    providing, by the hypervisor, access to a first file in the host memory identified in the first file request to the guest;
    mapping, by the hypervisor, a host memory address associated with the first file to a guest memory address in the guest prior to loading the first file into the host memory; and
    loading, by the hypervisor, the first file into the host memory, thereby resolving a page fault caused by the guest attempting to access the guest memory address.

11. A system comprising:
    (i) a processor, (ii) a host memory, (iii) a hypervisor including a filesystem daemon, and (iv) a guest including a storage controller,
    wherein the hypervisor is configured to:

receive a request to initialize a guest memory device in the guest, wherein the guest memory device is configured to provide access to files in the host memory to the guest;

allocate device memory associated with the guest memory device;

create a first plurality of queues and a different second plurality of queues in the device memory, wherein the filesystem daemon is configured to receive messages from both the first plurality of queues and the different second plurality of queues; and initialize the storage controller in the guest associated with the guest memory device, wherein the storage controller is configured to:
receive a file request;
translate the file request by at least converting the file request into a filesystem request in a format associated with a virtualized networking protocol and accepted by the filesystem daemon, wherein the converting comprises packing the filesystem request in a message envelope based on the virtualized networking protocol compatible with a filesystem queue of the first plurality of queues and the different second plurality of queues, wherein the virtualized networking protocol comprises a paravirtualization protocol; and
add the filesystem request to the filesystem queue, wherein the filesystem daemon is outside a userspace of the guest, wherein the filesystem daemon is configured to:
retrieve the filesystem request from the filesystem queue; and
provide access to a file in the host memory identified in the file request to the guest, wherein the hypervisor is further configured to:
map a host memory address associated with the file to a guest memory address in the guest prior to loading the file into the host memory, and
load the file into the host memory, thereby resolving a page fault caused by the guest attempting to access the guest memory address.

12. The system of claim 11, wherein the first plurality of queues are low priority queues and the different second plurality of queues are high priority queues, and wherein low priority queues handle file content requests and high priority queues handle at least one of file operations requests and metadata requests.

13. The system of claim 12, wherein a first file content request is received by the filesystem daemon via a first queue of the first plurality of queues, and the filesystem daemon is configured to:
retrieve a first file from the host memory in response to the first file content request; and
load the first file into a second queue of the first plurality of queues for access by the guest.

14. The system of claim 13, wherein the filesystem daemon receives a cancellation request via the different second plurality of queues while loading the first file into the second queue; and responsive to receiving the cancellation request, the filesystem daemon stops loading the first file into the second queue.

15. The system of claim 13, wherein a metadata request to retrieve metadata related to a second file is received by the filesystem daemon via the different second plurality of queues while the filesystem daemon is handling the first file content request, and the metadata is provided to the guest before access to the first file is provided to the guest.

16. The system of claim 11, wherein a file content request includes an identifier of an identified part of the file to be accessed, and the filesystem daemon is configured to:
retrieve a segment of the file that includes the identified part from the host memory; and
send the segment to the guest via the first plurality of queues.

17. The system of claim 11, wherein the guest memory device appears to be a peripheral component interconnect device to applications on the guest.

18. The system of claim 11, wherein the guest directly accesses the file in the host memory via the guest memory address.

19. The system of claim 11, wherein one of the filesystem daemon and the hypervisor rejects the file request to access the file based on access permissions associated with the file.

* * * * *